(12) United States Patent
Battistini (10) Patent No.: US 9,018,271 B2
(45) Date of Patent: Apr. 28, 2015

(54) SELF-CRUSHING POLYURETHANE SYSTEMS

(75) Inventor: Alessia Battistini, Massenzatico (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/877,433

(22) PCT Filed: Nov. 2, 2011

(86) PCT No.: PCT/US2011/058956
§ 371 (c)(1),
(2), (4) Date: Apr. 2, 2013

(87) PCT Pub. No.: WO2012/061496
PCT Pub. Date: May 10, 2012

(65) Prior Publication Data
US 2013/0274364 A1    Oct. 17, 2013

(30) Foreign Application Priority Data
Nov. 3, 2010   (IT) .............................. MI2010A2036

(51) Int. Cl.
| C08G 18/00 | (2006.01) |
| C08G 18/76 | (2006.01) |
| C08G 18/48 | (2006.01) |
| C08G 18/40 | (2006.01) |
| C08G 101/00 | (2006.01) |

(52) U.S. Cl.
CPC .... *C08G 18/7671* (2013.01); *C08G 2101/0008* (2013.01); *C08G 18/485* (2013.01); *C08G 18/7664* (2013.01); *C08G 18/4072* (2013.01); *C08G 18/4816* (2013.01); *C08G 2101/0083* (2013.01)

(58) Field of Classification Search
USPC ......................................................... 521/159
See application file for complete search history.

(56) References Cited

U.S. PATENT DOCUMENTS

| 4,945,117 | A |   | 7/1990  | Gansen et al. |         |
|-----------|---|---|---------|---------------|---------|
| 5,070,114 | A |   | 12/1991 | Watts et al.  |         |
| 5,091,437 | A |   | 2/1992  | Lunardon et al. |       |
| 5,114,989 | A | * | 5/1992  | Elwell et al. | 521/159 |
| 5,374,667 | A |   | 12/1994 | Hinz et al.   |         |
| 5,491,177 | A | * | 2/1996  | De Witte      | 521/159 |
| 5,521,226 | A |   | 5/1996  | Bleys         |         |
| 5,594,040 | A | * | 1/1997  | Gerber et al. | 521/159 |
| 5,621,016 | A |   | 4/1997  | Murty et al.  |         |
| 5,668,378 | A |   | 9/1997  | Treboux et al. |        |
| 5,877,227 | A | * | 3/1999  | Murty         | 521/159 |
| 6,136,879 | A |   | 10/2000 | Nishida et al. |        |
| 6,262,139 | B1 | * | 7/2001 | Narayan et al. | 521/159 |
| 6,271,279 | B1 |   | 8/2001 | Nodelman et al. |       |
| 6,417,241 | B1 |   | 7/2002 | Huygens et al. |        |
| 6,569,913 | B1 |   | 5/2003 | Huygens et al. |        |
| 6,919,384 | B2 | * | 7/2005 | Yu            | 521/159 |
| 7,790,778 | B2 |   | 9/2010 | Chan et al.   |         |
| 2004/0266897 | A1 |   | 12/2004 | Apichatachutapan et al. | |
| 2005/0176840 | A1 | * | 8/2005 | Chan et al.   | 521/159 |
| 2006/0058408 | A1 |   | 3/2006 | Sam et al.    |         |
| 2006/0073321 | A1 |   | 4/2006 | Kaushiva et al. |       |
| 2009/0286897 | A1 | * | 11/2009 | Andries et al. | 521/159 |

FOREIGN PATENT DOCUMENTS

FR    2899230 A1    10/2007

OTHER PUBLICATIONS

"Technical Bulletin 117" Internet Citation, Mar. 1, 2000 pp. 1-8 XP00258654.
PCT/ US2011/058956 International Search Report and Written Opinion of the International Searching Authority.
PCT/ US2011/058956, International Preliminary Report on Patentability.

* cited by examiner

*Primary Examiner* — Melissa Rioja (57) ABSTRACT

Embodiments of the invention provide for polyurethane flexible foams that do not require a post production crushing step. These "self crushing" flexible foams neither collapse, skin peel, nor form voids upon demolding, and yet maintain excellent physical properties such as uniform cell sizes, high quality surface appearance, compression set, resistance to fatigue, etc.

19 Claims, 2 Drawing Sheets

SELF-CRUSHING POLYURETHANE SYSTEMS

FIELD OF THE INVENTION

Embodiments of the invention relate to polyurethane foams, more specifically to flexible polyurethane foams.

BACKGROUND OF THE INVENTION

Flexible polyurethane foams are well recognized articles of commerce. Flexible foams may be characterized by the process used in production thereof, either molded or free-rise. Free-rise foams are often made in a continuous slabstock process. Molded foams are typically manufactured within an enclosed chamber having the shape of the desired finished article. Flexible foams are widely employed in furniture, mattresses, automotive and numerous other applications. However, it is inherent in these foam types that most cell windows remain fully or partially intact at the time of production, thus necessitating a crushing process to enhance the air flow and to achieve the cushioning and property requirements of the end-use application. For very reactive systems, such as those encountered in molded seating where the reaction and the mold is maintained at elevated temperatures, the foams may exhibit a predominantly closed cell structure that requires immediate hot crushing to avoid shrinkage or warpage of the part.

Foam crushing requires a separate processing step, thereby increasing the cost and time of production. Furthermore, excessively high crushing forces can result in non-useable foam in the intended application if it is not possible to sufficiently open the foam or if the crushing process permanently distorts the part or tears the foam.

Furthermore, some polyurethane foams may have reduced fire retardant properties. In the case of flexible polyurethane foams, the reduced fire retardant properties may be enhanced by the open-cell nature of the foam and the large surface area per unit weight of foam. Therefore, there is a need for a polyurethane foam which does not require a crushing step while at the same time maintains desirable physical properties of the foam and has fire retardant properties.

SUMMARY OF THE INVENTION

Embodiments of the invention include a polyurethane foam which includes the reaction product of at least:
a) at least one isocyanate component having a free NCO content from 20 to 30% and including the reaction product of at least:
  a1) from 50 to 70% by weight of the isocyanate component of one or more isocynates having a combined composition by weight of from 10 to 35% of 2,4'-methylene diphenyl isocyanate and from 65 to 90% of 4,4'-methylene diphenyl isocyanate;
  a2) from 10 to 30% by weight of the isocyanate component of one or more polymethylene polyphenylisocyanate having a number average molecular weight of 320-500 and an average functionality of from 2.2 to 3; and
  a3) from 10 to 25% by weight of the isocyanate component of one or more polyether polyols having a number average molecular weight from 6000 to 8000, a polyoxyethylene content from 45 to 70% by weight of the one or more polyether polyols, and a primary OH content of 50 to 80%; and
b) at least one polyol component including:
  b1) from 30 to 45% by weight of the polyol component of one or more polyether polyols having a number average molecular weight from 5000 to 7000, a polyoxyethylene content from 10 to 20% by weight of the one or more polyether polyols, and a primary OH content of 70 to 90%;
  b2) from 35 to 50 by weight of the polyol component of one or more polyether polyols having a combined number average equivalent weight from 1500 to 1900, a polyoxyethylene content from 10 to 25 by weight of the one or more polyether polyols, and a primary OH content of 70 to 85%; and
  b3) from about 5 to 20 by weight of the polyol component of one or more polyether copolymer polyols.

Embodiments of the invention further includes a method for making a polyurethane foam which includes combining at least a) at least one isocyanate component and b) at least one polyol component in a mix head into a mold maintained at a temperature of 25-35° C., where:
the a) at least one isocyanate component has a free NCO content from 20 to 30% and includes the reaction product of at least:
  a1) from 50 to 70% by weight of the isocyanate component of one or more isocynates having a combined composition by weight of from 10 to 35% of 2,4'-methylene diphenyl isocyanate and from 65 to 90% of 4,4'-methylene diphenyl isocyanate;
  a2) from 10 to 30% by weight of the isocyanate component of one or more polymethylene polyphenylisocyanate having a number average molecular weight of 320-500 and an average functionality of from 2.2 to 3; and
  a3) from 10 to 25% by weight of the isocyanate component of one or more polyether polyols having a number average molecular weight from 6000 to 8000, a polyoxyethylene content from 45 to 70% by weight of the one or more polyether polyols, and a primary OH content of 50 to 60%; and
the b) at least one polyol component includes:
  b1) from 30 to 45% by weight of the polyol component of one or more polyether polyols having a number average molecular weight from 5000 to 7000, a polyoxyethylene content from 10 to 20% by weight of the one or more polyether polyols, and a primary OH content of 70 to 90%;
  b2) from 35 to 50 by weight of the polyol component of one or more polyether polyols having a combined number average equivalent weight from 1500 to 1900, a polyoxyethylene content from 10 to 25 by weight of the one or more polyether polyols, and a primary OH content of 70 to 85%; and
  b3) from about 5 to 20 by weight of the polyol component of one or more polyether copolymer polyol.

DESCRIPTION OF EMBODIMENTS OF THE INVENTION

Embodiments of the present invention provide for polyurethane flexible foams that do not require a post production crushing step. These "self crushing" flexible foams neither collapse, skin peel, nor form voids upon demolding, and yet maintain excellent physical properties such as uniform cell sizes, high quality surface appearance, compression set, resistance to fatigue, etc. Furthermore, it has surprisingly been found that embodiments of the polyurethane flexible foams have fire retardant properties such that they meet the requirements of the State Of California, Department of Consumer Affairs, Bureau of Home Furnishings and Thermal Insulation, Technical Bulletin 117.

Embodiments of the invention also provide greater processing latitude for which the foams may be produced. Processing latitude means the tolerance limits within which it is possible to deviate from a foaming process and still maintain commercially acceptable processing and foam property requirements. Foaming process factors may include component and/or mold temperatures, demold times, and foam cure times instability. For example, according to embodiments of the invention, mold temperatures may be maintained at ambient temperatures or from 25° C. to 35° C. while maintaining a demold time of less than 5 minutes without observing any skin peeling of the foam upon demolding.

Embodiments encompass polyurethane foams which may be the reaction products of at least: a) at least one isocyanate component having a free NCO content from 20 to 30% and b) at least one polyol component.

The a) at least one isocyanate component may be a reaction product of at least:
- a1) from 50 to 70% by weight of the isocyanate component of one or more isocynates having a combined composition by weight of from 10 to 35% of 2,4'-methylene diphenyl isocyanate and from 65 to 90% of 4,4'-methylene diphenyl isocyanate,
- a2) from 10 to 30% by weight of the isocyanate component of one or more polymethylene polyphenylisocyanate having a number average molecular weight of 320-500 and an average functionality of from 2.2 to 3.5, and
- a3) from 10 to 25% by weight of the isocyanate component of one or more polyether polyols having a combined number average molecular weight from 6000 to 8000, a polyoxyethylene content from 45 to 70% by weight of the one or more polyether polyols, and a primary OH content of 50 to 80%.

The b) at least one polyol component may include:
- b1) from 30 to 45% by weight of the polyol component of one or more polyether polyols having a number average molecular weight from 5000 to 7000, a polyoxyethylene content from 10 to 20% by weight of the one or more polyether polyols, and a primary OH content of 70 to 90%;
- b2) from 35 to 50 by weight of the polyol component of one or more polyether polyols having a combined number average equivalent weight from 1500 to 1900, a polyoxyethylene content from 10 to 25 by weight of the one or more polyether polyols, and a primary OH content of 70 to 85%; and
- b3) from about 5 to 20 by weight of the polyol component of one or more polyether copolymer polyols.

Component a1) may be from 50 to 70% by weight of a). All individual values and subranges from 50 to 70% by weight of a) are included herein and disclosed herein; for example, the amount can be from a lower limit of about 50, 55, 60, or 65 weight % to an upper limit of about 55, 60, 65, or 70 weight %.

Component a1) may include one or more combinations of isocyanates such that from 10 to 35% by weight of a1) is 2,4'-methylene diphenyl isocyanate. All individual values and subranges from 10 to 35% by weight of a1) are included herein and disclosed herein; for example, the amount can be from a lower limit of about 10, 15, 20, or 25 weight % to an upper limit of about 20, 25, 30, or 35 weight %.

Component a1) may include one or more combinations of isocyanates such that from 65 to 90% by weight of a1) is 4,4'-methylene diphenyl isocyanate. All individual values and subranges from 65 to 90% by weight of a1) are included herein and disclosed herein; for example, the amount can be from a lower limit of about 65, 70, 75, or 80 weight % to an upper limit of about 75, 80, 85, or 90 weight %.

2,4'-methylene diphenyl isocyanate, 4,4'-methylene diphenyl isocyanate, and mixtures thereof are generically referred to as MDI, and all can be used. Suitable MDI products are available from The Dow Chemical Company under the trade name ISONATE, and suitable ratios of 2,4-MDI/4,4'MDI can be obtained by combining one or more different ISONATE products. In one embodiment, a combination of ISONATE OP 30 and ISONATE M 125 are used.

Component a2) may be from 10 to 30% by weight of a). All individual values and subranges from 10 to 30% by weight of a) are included herein and disclosed herein; for example, the amount can be from a lower limit of about 10, 15, or 20 weight % to an upper limit of about 20, 25, or 30 weight %.

Component a2) includes one or more polymethylene polyphenylisocyanate having a number average molecular weight of 320-500 and an average functionality of from 2.2 to 3.5. Suitable polymethylene polyphenylisocyanates are mixtures of polymethylene polyphenylene isocyanates in monomeric MDI. Especially suitable polymeric MDI products have a free MDI content of from 5 to 50% by weight, more preferably 10 to 40% by weight. Such polymeric MDI products are available from The Dow Chemical Company under the trade names PAPI and VORANATE. An especially preferred polyisocyanate is a polymeric MDI product having an average isocyanate functionality of from 2.6 to 3.3 isocyanate groups/molecule and an isocyanate equivalent weight from 130 to 170. Suitable commercially available products of that type include PAPI 27, VORANATE M229, VORANATE 220, VORANATE 290, VORANATE M595 AND VORANATE M600, all of which are available from The Dow Chemical Company.

Component a3) may be from 10 to 25% by weight of a). All individual values and subranges from 10 to 25% by weight of a) are included herein and disclosed herein; for example, the amount can be from a lower limit of about 10, 15, or 20 weight % to an upper limit of about 15, 20, or 25 weight %.

Component a3) may be one or more polyether polyols having a combined number average molecular weight from 6000 to 8000. All individual values and subranges from 6000 to 8000 are included herein and disclosed herein; for example, the combined number average molecular weight can be from a lower limit of about 6000, 6500, 7000, or 7500 to an upper limit of about 7000, 7500, or 8000.

Component a3) may have a polyoxyethylene content from 45 to 70% by weight of a3). All individual values and subranges from 45 to 70% by weight of a3) are included herein and disclosed herein; for example, the content can be from a lower limit of about 45, 47, 49, 50, 52, 55, 57, 59, 60, 61, 62, 63, 64, or 65 weight % to an upper limit of about 66, 67, 68, 69, or 70 weight %.

Component a3) may have a primary OH content of 50 to 80%. All individual values and subranges from 50 to 60% of a3) are included herein and disclosed herein; for example, the content can be from a lower limit of about 50, 52, 55, 57, 59, 60, 61, 62, 63, 64, or 65% to an upper limit of about 66, 67, 68, 69, 70, 75, or 80%.

Component a3) may have a nominal functionality of from about 2 to about 6. All individual values and subranges from 2 to 6 are included herein and disclosed herein; for example, the functionality can be from a lower limit of about 2, 3, or 4 to an upper limit of about 3, 4, 5, or 6.

Embodiments of a3) may include glycerin initiated polyoxypropylene polyether polyol, which have a polyoxyethylene cap of 55-70%, and 50-60% primary OH. Suitable commercially available products of that type include IP 010 available from The Dow Chemical Company.

Component a) may optionally include a4) at least one catalyst to promote the reaction of components a1) and a2) with component a3) to form a prepolymer. Examples of urethane catalysts include benzoyl chloride; tertiary amines such as triethylamine, 1,4-diazabicyclo[2.2.2]octane (DABCO), N-methylmorpholine, N-ethylmorpholine, N,N,N',N'-tetramethylhexamethylenediamine, 1,2-dimethylimidazol; and tin compounds such as tin(II)acetate, tin(II)octanoate, tin(II) laurate, dibutyltin dilaurate, dibutyltin dimaleate, dioctyltin diacetate and dibutyltin dichloride. The catalysts are optionally used alone or as mixtures thereof.

The reaction of components a1) and a2) with component a3) may be heated to temperatures between 20° C. and 100° C., and may take 1-6 hours to complete. In one embodiment the reaction is heated to 70° C. for about 90 minutes.

Component b1) may be from 30 to 45% by weight of b). All individual values and subranges from 30 to 45% by weight of a3) are included herein and disclosed herein; for example, the content can be from a lower limit of about 30, 35, or 40 weight % to an upper limit of about 35, 40, or 45 weight %.

Component b1) may be one or more polyether polyols having a number average molecular weight from 5000 to 7000. All individual values and subranges from 5000 to 7000 are included herein and disclosed herein; for example, the combined number average molecular weight can be from a lower limit of about 5000, 5500, 6000, or 6500 to an upper limit of about 5500, 6000, 6500, or 7000.

Component b1) may have a polyoxyethylene content from 10 to 20% by weight of b1). All individual values and subranges from 10 to 20% by weight of b1) are included herein and disclosed herein; for example, the content can be from a lower limit of about 10, 12, 14, 15, 16, or 18 weight % o an upper limit of about 14, 15, 16, 18, or 20 weight %.

Component b1) may have a primary OH content of 70 to 90%. All individual values and subranges from 70 to 90% are included herein and disclosed herein; for example, the primary OH content can be from a lower limit of about 70, 75, or 80% to an upper limit of about 75, 80, 85, or 90%.

Component b1) may have a nominal functionality of from about 2 to about 6. All individual values and subranges from 2 to 6 are included herein and disclosed herein; for example, the functionality can be from a lower limit of about 2, 3, or 4 to an upper limit of about 3, 4, 5, or 6.

Embodiments of b1) encompass glycerin initiated polyoxypropylene polyether polyols with polyoxyethylene caps.

Component b2) may be from 35 to 50% by weight of b). All individual values and subranges from 35 to 50% by weight of b1) are included herein and disclosed herein; for example, the amount can be from a lower limit of about 35, 40, or 45 weight % to an upper limit of about 40, 45, or 50 weight %.

Component b2) may be one or more polyether polyols having a combined number average equivalent weight from 1500 to 1900. All individual values and subranges from 31500 to 1900 are included herein and disclosed herein; for example, the combined number average equivalent weight can be from a lower limit of about 1500, 1550, 1600, 1650, or 1700 to an upper limit of about 1550, 1600, 1650, 1700, 1750, 1800, or 1900.

Component b2) may have a polyoxyethylene content from 10 to 25 by weight of b2). All individual values and subranges from 10 to 25 are included herein and disclosed herein; for example, the polyoxyethylene content can be from a lower limit of about 10, 12, 14, 15, 16, 18, or 20 weight % to an upper limit of about 14, 15, 16, 18, 20, 22, or 25 weight %.

Component b2) may have primary OH content of 70 to 85%. All individual values and subranges from 70 to 85% are included herein and disclosed herein; for example, the primary OH content can be from a lower limit of about 70, 75, or 80% to an upper limit of about 75, 80, or 85%.

Embodiments of b2) encompass polyoxypropylene polyoxyethylene polyols initiated with glycerol and/or sorbitol, having an average functionality from 4.5 to 5, and a polyoxyethylene cap. Suitable commercially available products of that type include SPECFLEX NC 632, available from The Dow Chemical Company.

Component b3) may be from about 5 to 20% by weight b). All individual values and subranges from 5 to 20% by weight of b) are included herein and disclosed herein; for example, the content can be from a lower limit of about 5, 7, 9, 10, 12, 14, 15, or 17 weight % to an upper limit of about 10, 12, 14, 15, 17, 19, or 20 weight %.

Component b3) may be a polymer polyol containing a monoalcohol or polyol having an equivalent weight of 500 or greater and a disperse polymer phase. The disperse polymer phase may be particles of an ethylenically unsaturated monomer (of which styrene, acrylonitrile and styrene-acrylonitrile copolymers are of particular interest), polyurea particles, or polyurethane particles. The disperse phase may constitute from 5 to 60% by weight of the polymer polyol. Embodiments encompass grafted polyether polyols containing from 30 to 50% copolymerized styrene and acrylonitrile (SAN). Suitable commercially available products of that type include SPECFLEX NC 700, available from The Dow Chemical Company.

The b) at least one polyol component may optionally also include b4) water in an amount of 0.5 to 7% by weight of b). All individual values and subranges from 0.5 to 7% by weight of b) are included herein and disclosed herein; for example, the content can be from a lower limit of about 0.5, 1, 1.5, 2, 2.5, 3, 3.5, 4, or 4.5 weight % to an upper limit of about 1, 1.5, 2, 2.5, 3, 3.5, 4, 4.5, 5, 6 or 7 weight %.

The b) at least one polyol component may optionally also include one or more b5) surfactants in an amount of 0.1 to 7% by weight of b). All individual values and subranges from 0.5 to 7% by weight of b) are included herein and disclosed herein; for example, the content can be from a lower limit of about 0.1, 0.5, 1, 1.5, 2, 2.5, 3, 3.5, 4, or 4.5 weight % to an upper limit of about 1, 1.5, 2, 2.5, 3, 3.5, 4, 4.5, 5, 6 or 7 weight %.

Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids may also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as TEGOSTAB (trademark of Evonik AG) B-8462, B-8404 and B-8871, B-8715LF, and DC-198 and DC-5043 surfactants, available from Dow Corning, and NIAX L-627 and NIAX L-618 surfactant from Momentive Performance Materials.

The b) at least one polyol component may optionally also include one or more b6) catalysts in an amount of 0.0015 to 4% by weight of b). All individual values and subranges from 0.0015 to 4% by weight of b) are included herein and disclosed herein; for example, the content can be from a lower limit of about 0.0015, 0.01, 0.1, 0.5, 1, 1.5, 2, 2.5, or 3 weight % to an upper limit of about 0.5, 1, 1.5, 2, 2.5, 3, 3.5, or 4 weight %.

A wide variety of materials are known to catalyze polyurethane forming reactions, including tertiary amines; tertiary phosphines such as trialkylphosphines and dialkylbenzylphosphines; various metal chelates such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni; acid metal salts of strong acids, such as ferric chloride, stannic chloride, stannous chloride, antimony trichloride, bismuth nitrate and bismuth chloride; strong bases such as alkali and alkaline earth metal hydroxides, alkoxides and phenoxides, various metal alcoholates and phenolates such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino) alcohols; alkaline earth metal, Bi, Pb, Sn or Al carboxylate salts; and tetravalent tin compounds, and tri- or pentavalent bismuth, antimony or arsenic compounds. Preferred catalysts include tertiary amine catalysts and organotin catalysts. Examples of commercially available tertiary amine catalysts include: trimethylamine, triethylamine, N-methylmorpholine, N-ethylmorpholine, N,N-dimethylbenzylamine, N,N-dimethylethanolamine, N,N-dimethylaminoethyl, N,N,N',N'-tetramethyl-1,4-butanediamine, N,N-dimethylpiperazine, 1,4-diazobicyclo-2,2,2-octane, bis(dimethylaminoethyl) ether, triethylenediamine and dimethylalkylamines where the alkyl group contains from 4 to 18 carbon atoms. Mixtures of these tertiary amine catalysts are often used. Examples of commercially available amine catalysts include NIAX Catalyst DMEE (a tertiary amine catalyst from Momentive Performance Materials Inc.), NIAX Catalyst C-174 (an amine blow catalyst from Momentive Performance Materials Inc.), NIAX A1 and NIAX A99 (bis(dimethylaminoethyl)ether in propylene glycol available from Momentive Performance Materials), NIAX B9 (N,N-dimethylpiperazine and N—N-dimethylhexadecylamine in a polyalkylene oxide polyol, available from Momentive Performance Materials), DABCO 8264 (a mixture of bis(dimethylaminoethyl)ether, triethylenediamine and dimethylhydroxyethyl amine in dipropylene glycol, available from Air Products and Chemicals), and DABCO 33LV (triethylene diamine in dipropylene glycol, available from Air Products and Chemicals), NIAX A-400 (a proprietary tertiary amine/carboxylic salt and bis(2-dimethylaminoethy)ether in water and a proprietary hydroxyl compound, available from Momentive Performance Materials); NIAX A-300 (a proprietary tertiary amine/carboxylic salt and triethylenediamine in water, available from Momentive Performance Materials); POLYCAT 58 (a proprietary amine catalyst available from Air Products and Chemicals), POLYCAT 5 (pentamethyl diethylene triamine, available from Air Products and Chemicals) and POLYCAT 8 (N,N-dimethyl cyclohexylamine, available from Air Products and Chemicals). Examples of organotin catalysts are stannic chloride, stannous chloride, stannous octoate, stannous oleate, dimethyltin dilaurate, dibutyltin dilaurate, other organotin compounds of the formula $SnRn(OR)4-n$, wherein R is alkyl or aryl and n is 0-2, and the like. Organotin catalysts are generally used in conjunction with one or more tertiary amine catalysts, if used at all. Commercially available organotin catalysts of interest include KOSMOS 29 (stannous octoate from Evonik AG), DABCO T-9 and T-95 catalysts (both stannous octoate compositions available from Air Products and Chemicals).

Polyurethane flexible foams may be produced by combining the a) at least one isocyanate component and the b) at least one polyol component, along with any optional additives. The isocyanate a) at least one isocyanate component and the b) at least one polyol component may be reacted at isocyanate indexes from 60 to 110. All individual values and subranges from 60 to 110 are included herein and disclosed herein; for example, the index can be from a lower limit of 60, 65, 70, 75, 80, 85, 90, or 95 to an upper limit of about 75, 80, 85, 90, 95, 99, 100, 105, or 110.

Slabstock foam is conveniently prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun. The resulting foams have densities below 100 kg/m3. All individual values and subranges below 100 kg/m3 are included herein and disclosed herein; for example, the density may be from a lower limit of 30, 35, 40, 45, 50, 55, 60, 65, 70, 75, or 80, to an upper limit of 40, 45, 50, 55, 60, 65, 70, 75, 80, 85, 90, or 95.

Molded foam can be made according to embodiments of the invention by transferring the reactants to a closed mold where the foaming reaction takes place to produce a shaped foam. Either a so-called "cold-molding" process, in which the mold is not preheated significantly above ambient temperatures, or a "hot-molding" process, in which the mold is heated to drive the cure, are optionally used. Molded foams may have densities below 100 $kg/m^3$. All individual values and sub ranges below 100 $kg/m^3$ are included herein and disclosed herein; for example, the density may be from a lower limit of 30, 35, 40, 45, 50, 55, 60, 65, 70, 75, or 80, to an upper limit of 40, 45, 50, 55, 60, 65, 70, 75, 80, 85, 90, or 95.

Embodiments encompass both cold-molding processes as well as hot-molded processes. However, surprisingly, it has been found that a demold time of less than 5, 4, or 3 minutes is obtainable without observing any skin peeling of the foam upon demolding even when the mold temperatures are maintained at ambient temperatures or from 25° C. to 35° C. Embodiments encompass demold times of 3 to 4 minutes without skin peeling with mold temperatures at ambient temperatures or from 25° C. to 35° C.

The resulting flexible foams have force-to-crush (FTC) values of less than 25 dN. FTC values lower than 25 dN is related to an easy crushing system, or a so-called "self crushing" foam—a foam that does not need to be mechanically crushed in order to avoid shrinkage or warpage of the foam. In some embodiments the FTC values are lower than 20 dN. FTC is the force in Newton (N) needed to compress a specimen at a certain % of its initial thickness (typically 50% or 40 mm). In case the values are >2KN the compression might be reduced at lower values.

The resulting foams also possess excellent physical properties such as uniform cell sizes, and high quality surface appearances.

Embodiments also encompass foams having a Green Load Bearing (GLB) of at least 12 dN. The test is done on the foam which has been mechanically crushed or crushed by hands; the specimen is compressed again at a certain % of its initial thickness (typically 50% or 40 mm), with the measured 30 seconds after the final thickness is reached.

Embodiments also encompass foams that have compression sets according to ISO 1856 of 6.4% at an index of 75 and/or compression sets of 5.9% at an index of 95.

Embodiments also encompass foams that have fatigue test height losses of less than 0.9% after 24 hours according to ISO 3385 at 80000 cycles and an index of 75, and/or a fatigue test load loss of less than 10% after 24 hours according to ISO 3385 at 80000 cycles and an index of 75.

Embodiments also encompass foams that have fatigue test height losses of less than 0.8% after 24 hours according to ISO 3385 at 80000 cycles and an index of 85, and/or a fatigue test load loss of less than 13% after 24 hours according to ISO 3385 at 80000 cycles and an index of 85.

Embodiments also encompass foams that have an elongation at break of at least 86%.

Embodiments also encompass foams that may pass flame tests as developed by the State Of California, Department of Consumer Affairs, Bureau of Home Furnishings and Thermal Insulation, Technical Bulletin 117 (Requirements, Test Procedure and Apparatus for Testing the Flame Retardance of Resilient Filling Materials Used in Upholstered Furniture) of March 2000, section A part 1 (Cal 117).

The flexible foams made in accordance with the embodiments described herein are useful in a variety of packaging and cushioning applications, such as mattresses, mattress toppers, pillows, packaging, bumper pads, sport and medical equipment, helmet liners, seats, articles of furniture, chairs, office seats cushioning, office seat back rests, office seat arm rests, etc.

EXAMPLES

The following examples are provided to illustrate the embodiments of the invention, but are not intended to limit the scope thereof. All parts and percentages are by weight unless otherwise indicated.

The following materials were used:

| | |
|---|---|
| ISONATE* 30 OP | A 32.5% percent 4,4'-methylene diphenyl isocyanate, 67.5% percent 2,4'-methylene diphenyl isocyanate mixture having a functionality of 2.0 and an equivalent weight of 125 g/equivalent available from The Dow Chemical Company. |
| ISONATE* 50 OP | A 49.6% percent 4,4'-methylene diphenyl isocyanate, 50.4% percent 2,4'-methylene diphenyl isocyanate mixture having a functionality of 2.0 and an equivalent weight of 125 g/equivalent available from The Dow Chemical Company. |
| ISONATE* M 125 | A 4,4'-methylene diphenyl diisocyanate (Pure MDI) based isocyanate available from The Dow Chemical Company. |
| VORANATE* M 220 | A low viscosity polymethylene polyphenylisocyanate of high reactivity, an average molecular weight of 340-380, a total isocyanate content of about 31%, and an average functionality of 2.7. |
| IP 010 | A glycerin initiated PO polyether polyol, having a number average molecular weight of about 7800, an PO/EO cap of 61-65%, and 50-60% primary OH. |
| SPECFLEX* NF 844 | It a silicone surfactant blend, available from the Dow chemical Company. |
| POLYETHER POLYOL | A glycerin initiated PO polyether polyol, having a number average molecular weight of 5700, a polyoxyethylene cap of around 14.5%, and about 85% primary OH. |
| SPECFLEX* NC 632 | A 1,700 equivalent weight polyoxypropylene polyoxyethylene polyol initiated with a blend of glycerol and sorbitol, having an average functionality around 4.7, a polyoxyethylene capped percentage around 15.2%, with a final primary OH around 77%. Available from The Dow Chemical Company. |
| VORANOL* CP 4610 | A glycerol initiated propylene oxide polyether triol with an 11 percent (based upon the total weight) ethylene oxide cap, having an average molecular weight of 4,800. Available from The Dow Chemical Company |
| VORALUX* HL 400 | A polymer polyol containing a 3000 molecular weight polyether triol as a base polyol and 40 wt. % styrene/acrylonitrile solids, |
| SPECFLEX* NC 700 | A grafted polyether polyol containing 40% copolymerized styrene and acrylonitrile (SAN). Available from The Dow Chemical Company. |
| NIAX Catalyst DMEE | A tertiary amine catalyst from Momentive Performance Materials Inc. |
| NIAX Catalyst C-174 | An Amine blow catalyst from Momentive Performance Materials Inc. |
| DEOA | Diethanolamine 99%, available from Aldrich. |
| POLYCAT 15 | N,N-bis-(3-dimethylaminopropyl)-amine available from Air Products and Chemicals, Inc. |
| DABCO NE 300 | A non corrosive delayed action gel catalyst. Available from Air Products. |
| TEGOSTAB B-8715LF | A low fogging, silicone-based surfactant available from Evonik Industries. |

*ISONATE, SPECFLEX, VORALUX, VORANATE and VORANOL are trademarks of The Dow Chemical Company.

Isocyanate Component

Two isocyanate components are prepared, one Experimental and one Comparative. The materials used and the relative amounts of each material is given in Table 1. The isocyanate blends are prepared by dosing isocyanates and the silicone surfactant (for the Comparative Examples) (SPECFLEX* NF 844), then mixing by drum roller for the proper time. Prepolymers are then formed by adding the polyol (IP 010) under mixing. The reaction is competed by heating inside a suitable reactor at 70° C. for 90 minutes.

TABLE 1

|  | Comparative | Example |
|---|---|---|
| ISONATE* 30 OP | 38 | 38 |
| ISONATE* 50 OP | 10.76 |  |
| ISONATE* M 125 |  | 16 |
| VORANATE* M 220 | 40 | 29 |
| IP 010 | 10 | 17 |
| SPECFLEX* NF 844 | 1.24 |  |
| total quantity | 100 | 100 |
| NCO Content | 28.8 | 26.7 |
| o.p % (2,4'-MDI) | 16.7-19.1 | 18.6-22.4 |
| p.p % (4,4'-MDI) | 43.2-47.2 | 76.6-80.4 |

Polyol Component

Two polyol components are prepared, one Experimental and one Comparative. The materials used and the relative amounts of each material is given in table 2. The formulated polyols have been prepared by dosing base polyol, silicone surfactants, catalyst, crosslinkers, additives in the order, then checking the water content after proper mixing by blades stirrer. The desired final water is obtained by adding the remaining needed water, then mixing for 15 minutes, at ambient temperature.

TABLE 2

|  | Comparative | Example |
|---|---|---|
| POLYETHER POLYOL | 60.4 | 40 |
| SPECFLEX* NC 632 | 20 | 45 |
| VORANOL* CP 4610 | 10 |  |
| VORALUX* HL 400 | 5 |  |
| SPECFLEX* NC 700 |  | 10 |
| NIAX Catalyst DMEE |  | 0.1 |
| NIAX Catalyst C-174 | 0.1 | 0.2 |
| DEOA | 0.3 | 0.3 |
| POLYCAT 15 | 0.5 | 0.9 |
| DABCO NE 300 | 0.2 |  |
| TEGOSTAB B-8715 LF | 0.5 | 0.5 |
| water | 3 | 3 |
| total quantity | 100 | 100 |
| OH number (as KOH) mg KOH/g | 41.5 | 37 |
| water content (% wt) | 3 | 3 |
| total basicity (in Ac.Acetic) | 0.117 | 0.126 |

Foam Examples E1-E3 and Comparative Examples CE1-CE3

The Experimental Isocyanate Component and the Experimental Polyol Component are combined at various indexes to form Foam Examples E1-E3, while the Comparative Isocyanate Component and the Comparative Polyol Component are combined at various indexes to form Comparative Examples CE1-CE3. The polyurethane foams are made by a one-shot process using high pressure machines for the weighing and for the proper dispensing of the components in the correct. The components are maintained at 25° C. and are transferred to the mix head (FPL 14" mixing head) at 160 bar, and into a mold at 250 g/s. Foams are produces at three different isocyanate indexes (75, 85, and 95). Square moulds and epoxy seat moulds are used, heated by water recirculation set at a temperature of 25-35° C., and treated with solvent based release agent (ACMOSIL type) to allow the demolding. The demolding time is fixed at 3-4 minutes. The comparative examples show less than optimal appearance: several collapses, skin peeling, and some voids are observed. However, the examples show neither collapses, skin peeling, nor voids, but do have uniform cell sizes, high quality surface appearance, and a good soft touch feel.

The main physical properties of the foam can be found in Table 3,
Table 4, and
Table 5 below. Physical mechanical testing of the overall items is performed on squares parts at a bulk density of around 55 kg/m$^3$ (450 mm×300 mm×75 mm), after all samples have reached a stable level of cure: at a minimum of three days under ambient conditions (23° C., 50% relative humidity).

TABLE 3

|  |  | ISO 845 | ASTM 3574 |  | ISO 3386-1 | |
|---|---|---|---|---|---|---|
|  |  | Bulk | Ball |  | | |
|  | Index | density (Kg/m$^3$) | Rebound (%) | ISO 1856 Delta | Stress 40% | Hysteresis |
| CE1 | 75 | 53.48 | 59 | 6.4 | 3.26 | 17.02 |
| CE2 | 85 | 53.64 | 62 | 5.4 | 4.59 | 17.15 |
| CE3 | 95 | 53.73 | 59 | 5.3 | 6.29 | 18.86 |
| E1 | 75 | 52.62 | 61 | 6.4 | 3.74 | 19.17 |
| E2 | 85 | 52.59 | 61 | 5.8 | 5.15 | 21.10 |
| E3 | 95 | 53.4 | 62 | 5.9 | 6.83 | 22.68 |

TABLE 4

|  |  | FATIGUE TEST ISO 3385 - 80000 cycles | | | | | |
|---|---|---|---|---|---|---|---|
|  |  | after 10 min | | after 5 hours | | after 24 hours | |
|  | Index | % height loss | % load loss | % height loss | % load loss | % height loss | % load loss |
| CE1 | 75 | 2.10 | 15.20 | 1.40 | 13.00 | 0.90 | 10.60 |
| CE2 | 85 | 2.10 | 20.50 | 1.10 | 14.40 | 0.80 | 11.90 |
| CE3 | 95 | Not measured | Not measured | Not measured | Not measured | Not measured | Not measured |
| E1 | 75 | 2.10 | 17.70 | 1.00 | 12.10 | 0.60 | 9.90 |
| E2 | 85 | 2.10 | 18.80 | 1.20 | 14.40 | 0.50 | 12.60 |
| E3 | 95 | 2.40 | 19.40 | 1.50 | 18.70 | 0.70 | 13.70 |

TABLE 5

|  |  | Tear stress ASTM D 3574 | | Tensile ASTM D 3574 | |
|---|---|---|---|---|---|
|  | Index | Tear Strength (N/m) | Avg. tear (N/m) | Tensile Strength (N/mm$^2$) | Elongation at break (%) |
| CE1 | 75 | 125.33 | 100.37 | 0.076 | 83.30 |
| CE2 | 85 | 157.14 | 124.88 | 0.100 | 83.81 |
| CE3 | 95 | 174.18 | 142.62 | 0.134 | 85.33 |
| E1 | 75 | 160.01 | 133.27 | 0.089 | 95.43 |
| E2 | 85 | 179.36 | 149.23 | 0.109 | 91.93 |
| E3 | 95 | 192.19 | 152.80 | 0.117 | 87.29 |

Force to Crush (FTC) and Green Load Bearing (GLB) are both measured using compressive equipment having a rectangular shapes with an internal capacity of 5 liters (300 mm×350 mm×75 mm). The following foaming procedure is followed:

Apply a release agent inside the square mold homogeneously

Put an empty cup on the balance and reset to zero

Weight the exact amount of Polyol Component into the cup.

Reset the balance to zero and then weight, quickly and precisely, the amount of isocyanate.

Take the cup away from the balance, allocate it into the seat of an automated mixer.

Once mixed, pour the material into the mold having a rectangular shapes with an internal capacity of 5 liters Ensure the remaining material is in line with range indicated in standard procedure.

Lower the lid of the mold

At the end of the cycle (3-4 minutes), the foam is taken out from the mold having a rectangular shapes with an internal capacity of 5 liters paying attention to not crush the foam. Within 30 seconds from de-molding time, the Force to Crush is measured using a dynamometer plate instrument (INSTRON 4464). The "Peak value" given by the instrument is taken as the "Force to Crush" value.

Then, the foams are completely crushed using a crusher roller and the Green Hardness is checked immediately using the dynamometer plate compressing the foams at 50 of their original thickness, and the value measured 30 seconds after the target thickness is reached is the "Green Hardness" value.

Measurements are repeated three or four times at each Index to be statistically significant. Anova Analysis (analysis of variance) at low Isocyanate index (75:100, CE1 and E1) and at high Isocyanate Index (95:100, CE3 and E3) are performed.

Figure 1:
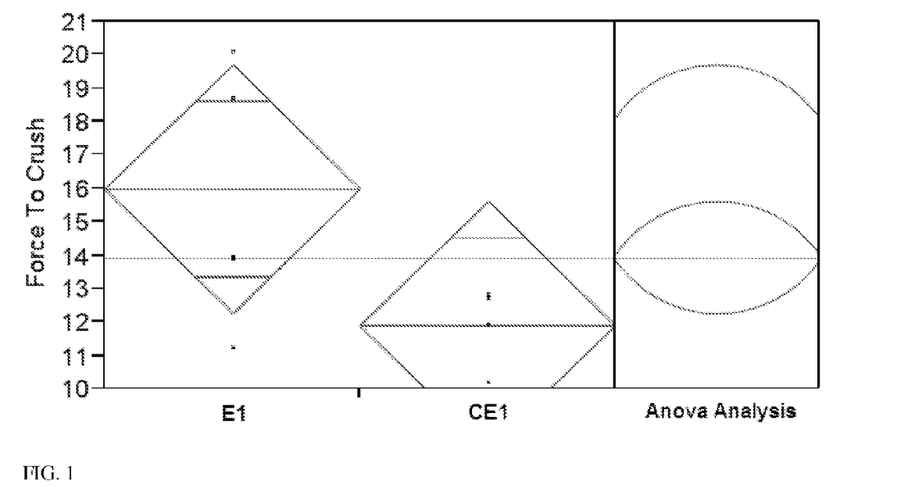
FIGS. 1 and 2 illustrate Force to Crush (FTC) and Green Load Bearing (GLB), respectively, at a relatively low isocyanate index.
Figure 2:
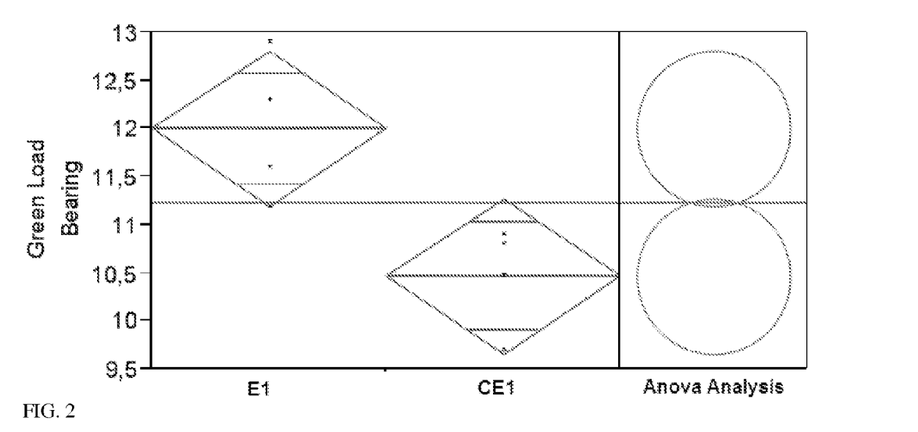
Figure 3:
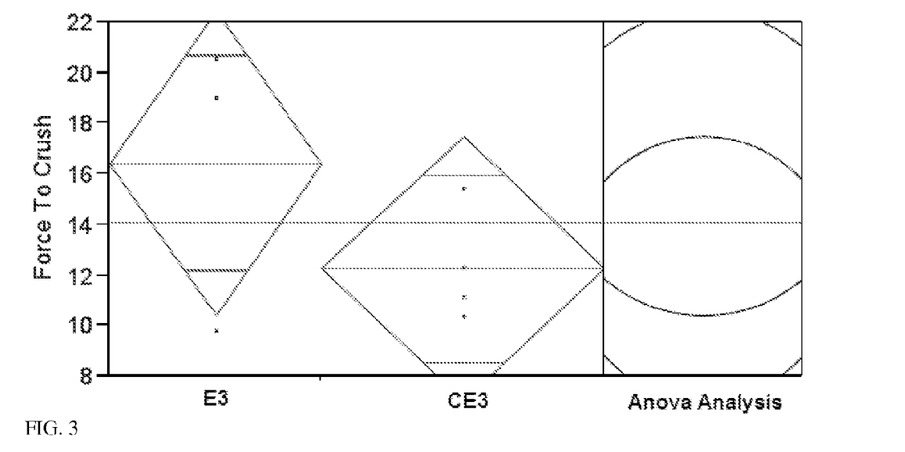
FIGS. 3 and 4 illustrate FTC and GLB, respectively, at a relatively high isocyanate index.
Figure 4:
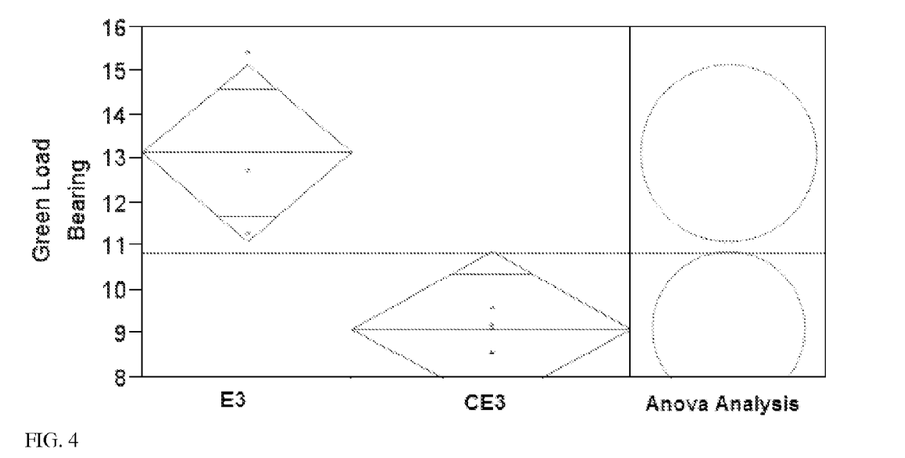

FIGS. 1 and 2 display FTC and GLB (respectively) at low isocyanate index (75:100), and FIGS. 3 and 4 display FTC and GLB (respectively) at high isocyanate index (95:100). At low isocyanate index it can be seen that the FTC overlaps between the Example (E1) and the Comparative Example (CE1). However, for GLB it can be seen that the Example (E1) performs better than the Comparative Example (CE1). Similarly, at high isocyanate index it can be seen that the FTC overlaps between the Example (E3) and the Comparative Example (CE3). However, for GLB it can be seen that the Example (E3) performs better than the Comparative Example (CE3). Higher values of GLB means a better curing of the foam at the demolding time. Comparative values of FTC mean that the Example specimens are at least as open as the Comparative Examples and that both systems may be called "easy crushing systems".

Flame Retardance, Foam Examples E4-E7 and Comparative Examples CE4-CE7

Foam Examples E4-E7 and Comparative Examples CE4-CE7 are made in the same manner as Foam Examples E1-E3 and Comparative Examples CE1-CE3, respectively, but with the indexes as given in Tables 6 and 7. The foams are flame tested according to the State Of California, Department of Consumer Affairs, Bureau of Home Furnishings and Thermal Insulation, Technical Bulletin 117 (Requirements, Test Procedure and Apparatus for Testing the Flame Retardance of Resilient Filling Materials Used in Upholstered Furniture) of March 2000, section A part 1 (Cal 117). The flexible foams are cut into specimens (304.8 mm×76.2 mm×12.7 mm) using an electric saw. For each formulation, 10 specimens are tested (five before aging, 5 after aging). Specimens are exposed to a flame for 12 seconds and then After Flame Time (AFT) and Char Length are recorded. The requirements of the tests are:

1. The average char length of all specimens shall not exceed 6 inches.
2. The maximum char length of any individual specimen shall not exceed 8 inches.
3. The average afterflame, including afterflame of molten material or other fragments dropping from specimens, shall not exceed 5 seconds.
4. The maximum afterflame of any individual specimen, including afterflame of molten material or other fragments dropping from the specimen, shall not exceed 10 seconds.
5. The average afterglow, including afterglow of molten material or other fragments dropping from the specimen, shall not exceed 15 seconds.
6. Resilient cellular materials shall meet the above requirements both before and after aging for 24 hours in a forced air circulating oven at 220° F. (104° C.).

TABLE 6

| | Index | Char Length (Inches) | After Flame (Seconds) | After Glow (Seconds) | Char Length (Inches) | After Flame (Seconds) | After glow (seconds) |
|---|---|---|---|---|---|---|---|
| | | Before Aging | | | After Aging | | |
| E4 | 70 | 2.7 | 0 | 0 | 3.1 | 0 | 0 |
| E4 | 70 | 2.4 | 0 | 1 | 3.3 | 0 | 1 |
| E4 | 70 | 2.0 | 0 | 2 | 3.2 | 0 | 1 |
| E4 | 70 | 2.4 | 0 | 0 | 3.4 | 0 | 0 |
| E4 | 70 | 2.3 | 0 | 1 | 3.1 | 0 | 1 |
| E4 Average | 70 | 2.4 | 0 | 0.8 | 3.2 | 0 | 0.6 |
| E5 | 80 | 3.3 | 0 | 3 | 3.4 | 0 | 0 |
| E5 | 80 | 3.5 | 0 | 2 | 3.1 | 0 | 38 |
| E5 | 80 | 3.3 | 0 | 2 | 3.3 | 0 | 2 |
| E5 | 80 | 3.3 | 0 | 0 | 3.1 | 0 | 0 |
| E5 | 80 | 3.3 | 0 | 2 | 3.3 | 0 | 2 |
| E5 Average | 80 | 3.4 | 0 | 1.8 | 3.3 | 0 | 8.4 |
| E6 | 85 | 3.0 | 2 | 4 | 3.8 | 0 | 3 |
| E6 | 85 | 3.4 | 0 | 2 | 3.5 | 0 | 3 |
| E6 | 85 | 3.0 | 45 | 1 | 3.2 | 0 | 2 |
| E6 | 85 | 3.0 | 0 | 2 | 3.6 | 0 | 3 |
| E6 | 85 | 3.2 | 2 | 2 | 3.5 | 0 | 4 |
| E6 Average | 85 | 3.1 | 9.8 | 2.2 | 3.5 | 0 | 3 |
| E7 | 90 | 2.8 | 5 | 0 | 4.0 | 49 | 5 |
| E7 | 90 | 3.0 | 40 | 0 | 4.1 | 0 | 5 |
| E7 | 90 | 4.1 | 36 | 0 | 4.3 | 50 | 3 |
| E7 | 90 | 3.1 | 51 | 0 | 3.9 | 60 | 3 |
| E7 | 90 | 3.8 | 45 | 0 | 4.6 | 76 | 5 |
| E7 Average | 90 | 3.4 | 35.4 | 0 | 4.2 | 47 | 4.2 |

TABLE 7

| | Index | Char Length (Inches) | After Flame (Seconds) | After Glow (Seconds) | Char Length (Inches) | After Flame (Seconds) | After glow (seconds) |
|---|---|---|---|---|---|---|---|
| | | Before Aging | | | After Aging | | |
| CE4 | 70 | 8.9 | 3.5 | 0 | 0 | 10.2 | 4.0 |
| CE4 | 70 | 7.6 | 3.0 | 0 | 2 | 8.0 | 3.1 |
| CE4 | 70 | 9.0 | 3.5 | 0 | 2 | 8.0 | 3.1 |
| CE4 | 70 | 8.2 | 3.2 | 0 | 2 | 7.0 | 2.8 |
| CE4 | 70 | 10.5 | 4.1 | 0 | 2 | 8.6 | 3.4 |
| C4 Average | 70 | 8.8 | 3.5 | 0 | 1.6 | 8.4 | 3.3 |
| CE5 | 80 | 8.6 | 3.4 | 0 | 4 | 9.0 | 3.5 |
| CE5 | 80 | 8.2 | 3.2 | 0 | 2 | 10.6 | 4.2 |
| CE5 | 80 | 8.5 | 3.3 | 0 | 2 | 10.0 | 3.9 |
| CE5 | 80 | 9.6 | 3.8 | 0 | 4 | 11.0 | 4.3 |
| CE5 | 80 | 9.1 | 3.6 | 17 | 2 | 9.3 | 3.7 |
| CE5 | 80 | 8.8 | 3.5 | 3.4 | 2.8 | 10.0 | 3.9 |

TABLE 7-continued

| | Index | Char Length (Inches) | After Flame (Seconds) | After Glow (Seconds) | Char Length (Inches) | After Flame (Seconds) | After glow (seconds) |
|---|---|---|---|---|---|---|---|
| | | Before Aging | | | After Aging | | |
| Average | | | | | | | |
| CE6 | 85 | 8.5 | 3.3 | 20 | 0 | 10.5 | 4.1 |
| CE6 | 85 | 8.0 | 3.1 | 0 | 2 | 11.4 | 4.5 |
| CE6 | 85 | 10.5 | 4.1 | 6 | 0 | 9.0 | 3.5 |
| CE6 | 85 | 10.0 | 3.9 | 74 | 4 | 8.7 | 3.4 |
| CE6 | 85 | 8.9 | 3.5 | 6 | 4 | 8.7 | 3.4 |
| CE6 Average | 85 | 9.2 | 3.6 | 21.2 | 2 | 9.7 | 3.8 |
| CE7 | 90 | 8.0 | 3.1 | 33 | 2 | 11.0 | 4.3 |
| CE7 | 90 | 9.5 | 3.7 | 43 | 2 | 10.0 | 3.9 |
| CE7 | 90 | 9.0 | 3.5 | 30 | 2 | 9.0 | 3.5 |
| CE7 | 90 | 9.0 | 3.5 | 16 | 0 | 9.7 | 3.8 |
| CE7 | 90 | 9.3 | 3.7 | 28 | 0 | 10.0 | 3.9 |
| CE7 Average | 90 | 9.0 | 3.5 | 30 | 1.2 | 9.9 | 3.9 |

It can be seen that the foams according to the embodiments of the invention give passing results in a wider range of isocyanate indexes than the comparative examples.

While the foregoing is directed to embodiments of the present invention, other and further embodiments of the invention may be devised without departing from the basic scope thereof, and the scope thereof is determined by the claims that follow.

The invention claimed is:

1. A polyurethane foam comprising the reaction product of at least:
   a) at least one isocyanate component having a free NCO content from 20 to 30% and comprising the reaction product of at least:
      a1) from 50 to 70% by weight, of the at least one isocyanate component, of one or more isocyanates having a combined composition by weight of from 10 to 35% of 2,4'-methylene diphenyl isocyanate and from 65 to 90% of 4,4'-methylene diphenyl isocyanate;
      a2) from 10 to 30% by weight, of the at least one isocyanate component, of one or more polymethylene polyphenylisocyanate having a number average molecular weight of 320-500 and an average functionality of from 2.2 to 3; and
      a3) from 10 to 25% by weight, of the at least one isocyanate component, of one or more polyether polyols having a number average molecular weight from 6000 to 8000, a polyoxyethylene content from 45 to 70% by weight of the one or more polyether polyols, and a primary OH content of 50 to 80%; and
   b) at least one polyol component comprising:
      b1) from 30 to 45% by weight, of the at least one polyol component, of one or more polyether polyols having a number average molecular weight from 5000 to 7000, a polyoxyethylene content from 10 to 20% by weight, and a primary OH content of 70 to 90%;
      b2) from 35 to 50% by weight, of the at least one polyol component, of one or more polyether polyols having a combined number average equivalent weight from 1500 to 1900, a polyoxyethylene content from 10 to 25% by weight, and a primary OH content of 70 to 85%; and
      b3) from about 5 to 20% by weight, of the at least one polyol component, of one or more polyether copolymer polyols.

2. The polyurethane foam of claim 1, wherein the polyurethane foam has a force-to-crush of less than 25 dN.

3. The polyurethane foam of claim 1, wherein the polyurethane foam has a force-to-crush of less than 20 dN.

4. The polyurethane foam of claim 2, wherein the polyurethane foam has a Green Load Bearing of at least 12 dN.

5. The polyurethane foam of claim 3, wherein the polyurethane foam demolds from a mold without skin peeling with a demold time of less than 5 minutes.

6. The polyurethane foam of claim 5, wherein the demold time is from 3 to 4 minutes without skin peeling.

7. The polyurethane foam of claim 6, wherein the mold is kept at a temperature between 25° C. and 35° C.

8. The polyurethane foam of claim 1, wherein the polyurethane foam has a compression set according to ISO 1856 of 6.4% at an isocyanate index of 75.

9. The polyurethane foam of claim 1, wherein the polyurethane foam has a compression set according to ISO 1856 of 5.9% at an isocyanate index of 95.

10. The polyurethane foam of claim 1, wherein the polyurethane foam has a fatigue test height loss of less than 0.9% after 24 hours according to ISO 3385 at 80000 cycles and an isocyanate index of 75.

11. The polyurethane foam claim 1, wherein the polyurethane foam has a fatigue test height loss of less than 0.8% after 24 hours according to ISO 3385 at 80000 cycles and an isocyanate index of 85.

12. The polyurethane foam of claim 1, wherein the polyurethane foam has a fatigue test load loss of less than 10% after 24 hours according to ISO 3385 at 80000 cycles and an isocyanate index of 75.

13. The polyurethane foam of claim 1, wherein the polyurethane foam has a fatigue test load loss of less than 13% after 24 hours according to ISO 3385 at 80000 cycles and an isocyanate index of 85.

14. The polyurethane foam of claim 1, wherein the polyurethane foam has an elongation at break of at least 86%.

15. A method for making a polyurethane foam, the method comprising:
   combining at least a) at least one isocyanate component and b) at least one polyol component in a mix head into a mold maintained at a temperature of 25-35° C., wherein:
   the a) at least one isocyanate component has a free NCO content from 20 to 30% and comprises the reaction product of at least:
      a1) from 50 to 70% by weight, of the at least one isocyanate component, of one or more isocyanates having a combined composition by weight of from 10 to 35% of 2,4'-methylene diphenyl isocyanate and from 65 to 90% of 4,4'-methylene diphenyl isocyanate;
      a2) from 10 to 30% by weight, of the at least one isocyanate component, of one or more polymethylene polyphenylisocyanate having a number average molecular weight of 320-500 and an average functionality of from 2.2 to 3; and
      a3) from 10 to 25% by weight, of the at least one isocyanate component, of one or more polyether polyols having a number average molecular weight from 6000 to 8000, a polyoxyethylene content from 45 to 70% by weight of the one or more polyether polyols, and a primary OH content of 50 to 60%; and
   the b) at least one polyol component comprises:
      b1) from 30 to 45% by weight, of the at least one polyol component, of one or more polyether polyols having a number average molecular weight from 5000 to 7000, a polyoxyethylene content from 10 to 20% by weight, and a primary OH content of 70 to 90%;

b2) from 35 to 50% by weight, of the at least one polyol component, of one or more polyether polyols having a combined number average equivalent weight from 1500 to 1900, a polyoxyethylene content from 10 to 25% by weight, and a primary OH content of 70 to 85%; and b3) from about 5 to 20% by weight, of the at least one polyol component, of one or more polyether copolymer polyol.

16. A polyurethane foam made by the method of claim 15.

17. The polyurethane foam of claim 1, wherein the polyurethane foam has an average char length of less than 6 inches, average afterflame of less than 5 seconds, and average afterglow of less than 15 seconds, measured according to State Of California, Department of Consumer Affairs, Bureau of Home Furnishings and Thermal Insulation, Technical Bulletin 117 of Requirements, Test Procedure and Apparatus for Testing the Flame Retardance of Resilient Filling Materials Used in Upholstered Furniture, of March 2000, section A part 1 and Cal 117.

18. An article of furniture comprising the polyurethane foam of claim 1.

19. A chair comprising the polyurethane foam of claim 1.

* * * * *